United States Patent [19]

Oberloier

[11] 4,099,902
[45] Jul. 11, 1978

[54] THERMOFORMING MACHINE

[75] Inventor: William Oberloier, Beaverton, Mich.

[73] Assignee: Lyle Development, Inc., Beaverton, Mich.

[21] Appl. No.: 772,590

[22] Filed: Feb. 28, 1977

[51] Int. Cl.$^2$ ............................................. B29C 17/04
[52] U.S. Cl. ............................ 425/388; 425/DIG. 48; 425/451
[58] Field of Search .............. 425/388, 451, DIG. 48, 425/397

[56] References Cited

U.S. PATENT DOCUMENTS

| 3,422,522 | 1/1969 | Mojonnier | 425/388 X |
| 3,513,505 | 5/1970 | Brown et al. | 425/388 X |
| 3,787,158 | 1/1974 | Brown et al. | 425/388 X |

Primary Examiner—Robert L. Spicer, Jr.

[57] ABSTRACT

A differential pressure forming machine including a pair of endless, sheet supply chains for supporting a deformable thermoplastic sheet and forwardly advancing the sheet, a heater for heating the thermoplastic sheet, a mold for differential pressure forming a shape in the heated sheet, a drive chain for driving the sheet supply chains, a clutch for selectively coupling and decoupling the drive chain and the supply chains, a pair of pneumatic cylinders mounting reciprocally movable pistons which are coupled to opposite ends of the drive chain for driving the sheet support chains in forward and reverse paths of travel, and control mechanism for operating the clutch and the pistons in timed relation so that the sheet support chains and the sheet are incrementally indexed only when the chain moves in said forward path of travel.

16 Claims, 3 Drawing Figures

THERMOFORMING MACHINE

BACKGROUND OF THE INVENTION

This invention relates to a differential pressure, thermoforming machine and more particularly to a differential pressure, forming machine having new and novel apparatus for incrementally advancing a sheet of plastic through the machine.

Differential pressure forming machines, such as that disclosed in U.S. Pat. No. 3,496,257 granted to G. W. Brown, et al., on Feb. 17, 1970 and U.S. Pat. No. 3,664,791, granted to G. W. Brown on May 23, 1972, have pairs of laterally spaced, longitudinally extending chains for advancing sheets of plastic therethrough. These patents disclose a drive system for the sheet support chains comprising a cooperating drive rack and pinion gear, the rack being reciprocally driven by the piston of a fluid operated cylinder. A clutch is provided for coupling and decoupling the pinion gear to the sheet support chains so that the sheet support chains are incrementally forwardly indexed. Many problems are associated with the use of such gear racks. The prior art drive rack system is difficult to maintain and difficult to keep properly adjusted. Accordingly, it is an object of the present invention to provide a differential pressure thermoforming machine of the type described which includes a new and improved drive train for incrementally forwardly indexing the sheet support chains.

Trimming devices are commonly mounted in-line and downstream of a thermoforming mold to trim the formed part from the remainder of the sheet. It is important to index the sheet the same distance so that the in-line trimming apparatus will properly trim the part. The prior art gear rack incorporated relatively expensive and complicated damper mechanism for damping the inertia built up during the sheet advancing stroke. Such damping apparatus is difficult and expensive to maintain. Accordingly, it is an object of the present invention to provide a differential pressure forming machine including a sheet indexing system which is simpler, less expensive to construct and easier to maintain in adjustment.

It is another object of the present invention to provide a differential pressure thermoforming machine of the type described including a drive train which has improved stroke cushioning capabilities.

Yet another object of the present invention is to provide a differential pressure thermoforming machine of the type described including a new and improved drive train having new and improved apparatus for controlling the stroke length.

Another object of the present invention is to provide, in a differential pressure thermoforming machine, a new and improved drive train for the sheet advancing chains including a drive chain driven in a to-and-fro path of travel by the pistons of a pair of fluid operated cylinders coupled to opposite ends of the drive chain.

Still another object of the present invention is to provide a differential pressure forming machine including a pair of fluid operated oppositely operating drive cylinders, drive mechanisms one of which dampens the travel of the other.

Yet another object of the present invention is to provide a differential pressure forming machine of the type described including a pair of fluid driven cylinders having pistons for driving a drive chain in a to-and-fro path of travel and including mechanism for eliminating slack in the drive chain.

The present invention may more readily be understood by reference to the accompanying drawings in which.

Other objects and advantages of the present invention will become apparent to those of ordinary skill in the art as the description thereof proceeds.

SUMMARY OF THE INVENTION

A differential pressure forming machine comprising a heater for heating a moldable, thermoplastic sheet to a forming temperature, a mold for applying differential pressure to the heated sheet to form a shape therein, a pair of endless, laterally spaced, longitudinally extending sheet support members for supporting the sheet and sequentially moving the sheet to the heater and to the mold, a drive chain for driving the support chains, a pair of fluid receiving cylinders mounting pistons which are coupled to opposite ends of a drive chain for driving the chains in a forward and reverse path of travel, and a clutch for coupling said drive chain to the driven chains only when the drive chains move in one of the forward and reverse paths of travel to incrementally index the sheet to the heater and to the mold.

DESCRIPTION OF THE INVENTION

Figure 1:
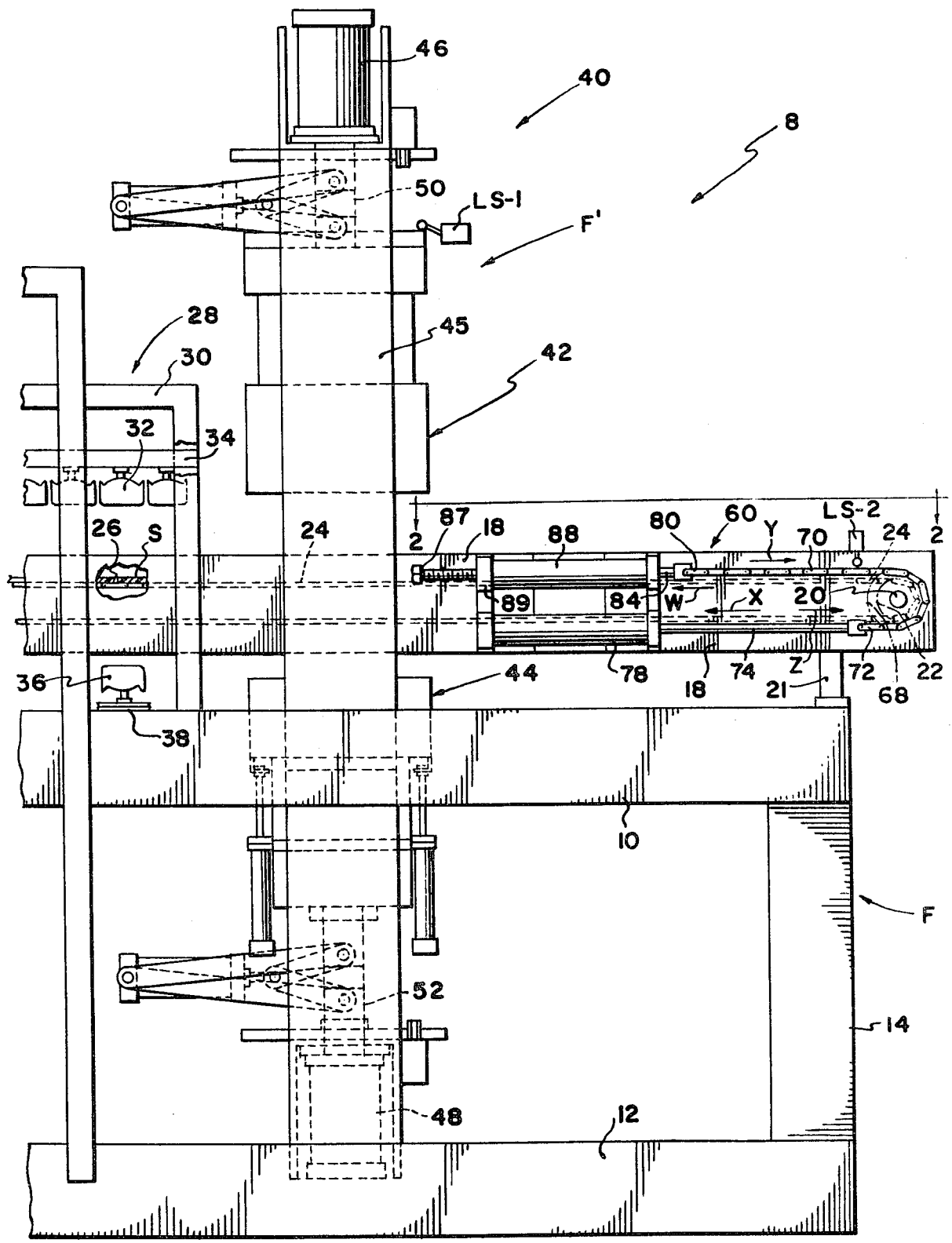
FIG. 1 is a side elevational view of a differential pressure forming machine constructed according to the present invention.

A differential pressure forming machine constructed according to the present invention is generally designated 8 and includes a frame, generally designated F, including upper and lower longitudinally extending frame members 10 and 12 spanned by vertical end frame members 14 and upper and lower end cross members 16. The frame F also includes a pair of side rails 18, supported on the end cross member 16 via vertical posts 21, journalling at opposite ends thereof a pair of rotary shafts 20 mounting laterally spaced sprocket wheels 22. A pair of laterally spaced, longitudinally extending, endless, sheet supporting chains 24 are trained around the sprocket wheels 22 for carrying a continuous sheet or web of thermoplastic material, such as polyethylene, generally designated S (FIG. 1). The chains 24 mount sheet penetrating pins 26 such as that disclosed in U.S. Pat. No. 3,664,791, granted to Mr. G. W. Brown on May 23, 1972, which patent is incorporated herein by reference.

Mounted on the frame F is a heater assembly, generally designated 28, for heating the thermoplastic sheet S to a forming temperature. The heater 28 includes side frame members 30, mounted on the upper side rails 10, spanned by cross bars 34 which mount banks of electrically powered heaters 32. The heater 28 also includes an additional bank of electrically powered heaters 36 mounted on cross bars 38 which are supported by the side frame members 10 for assisting the heaters 32 to bring the sheet S to a forming temperature.

Mounted downstream of the heater 28 is a differential pressure mold assembly, generally designated 40, including an upper, female die box assembly, generally designated 42, and a lower male die box assembly, generally designated 44 on the underside of the sheet S. The mold assembly, generally designated 40, is mounted on a sub-frame, generally designated F' including upstanding side rails 45 supported by the frame side rails 10, mounting upper and lower pneumatically operated cylinders 46 and 48 having piston rods 50 and 52 respectively in a manner disclosed more particularly in U.S. Pat. No. 3,496,257, granted to G. W. Brown on Feb. 17, 1970 which is also incorporated herein by reference. The mold assembly 40 is more particularly described in the aforementioned U.S. Pat. No. 3,496,257 and will not be repeated in detail herein.

The apparatus for sequentially, incrementally forwardly indexing the sheet support chains 24 is generally designated 60 and includes a frame supported clutch assembly, generally designated 62, having one clutch plate 64 coupled to the shaft 20 and a cooperating clutch plate 66 mounting a sprocket wheel 68. The clutch assembly 62 is schematically illustrated and is more particularly illustrated in U.S. Pat. No. 3,217,852, granted to G. W. Brown, et al. on Nov. 16, 1965, which is incorporated herein by reference. The clutch assembly 62 may also comprise a jaw type clutch, commonly known as a Horton clutch.

Apparatus for driving the clutch sprocket wheel 68 comprises a link chain 70, trained around the sprocket wheel 68, having one end 72 coupled to a piston rod 74 mounted on an advance piston 76 received in an advance, pneumatically operated, double acting cylinder 78 which is mounted on one of the side rails 18. The opposite end 80 of the drive chain 70 is coupled to a piston rod 84, mounted on a retract piston 86 (FIG. 3), slidably received by a return cylinder 88 which is also mounted on one of the side rails 10. An adjustable stop 87 is threadedly received in an end wall 89 of the return cylinder 88 for adjustably controlling the length of index or return stroke of piston 86. A limit switch LS-1 is mounted on the upstanding side frame rail 45 and is actuated by the upper mold 42 when the upper mold 42 is in the raised position. A limit switch LS-2 is mounted on the frame side rail 18 in the path of return piston rod 74 and is actuated when return piston rod 74 is fully extended.

FLUID AND ELECTRICAL CONTROL CIRCUIT

Figure 2:
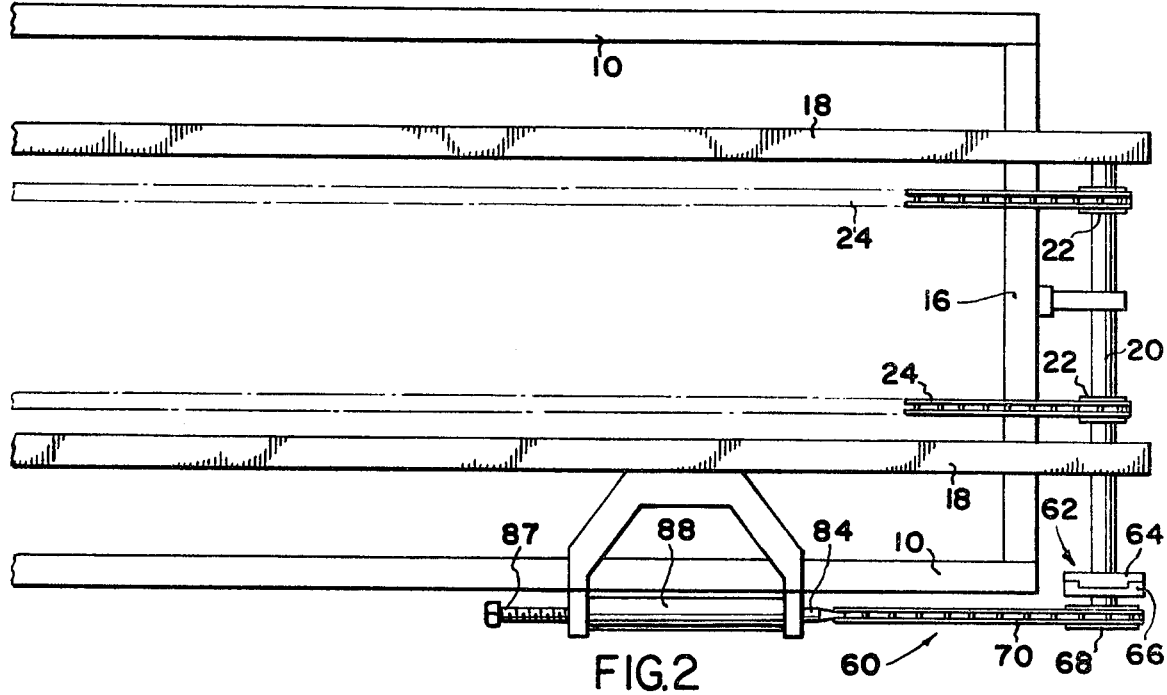
FIG. 2 is a sectional, top plan view, taken along the line 2—2 of FIG. 1.
Figure 3:
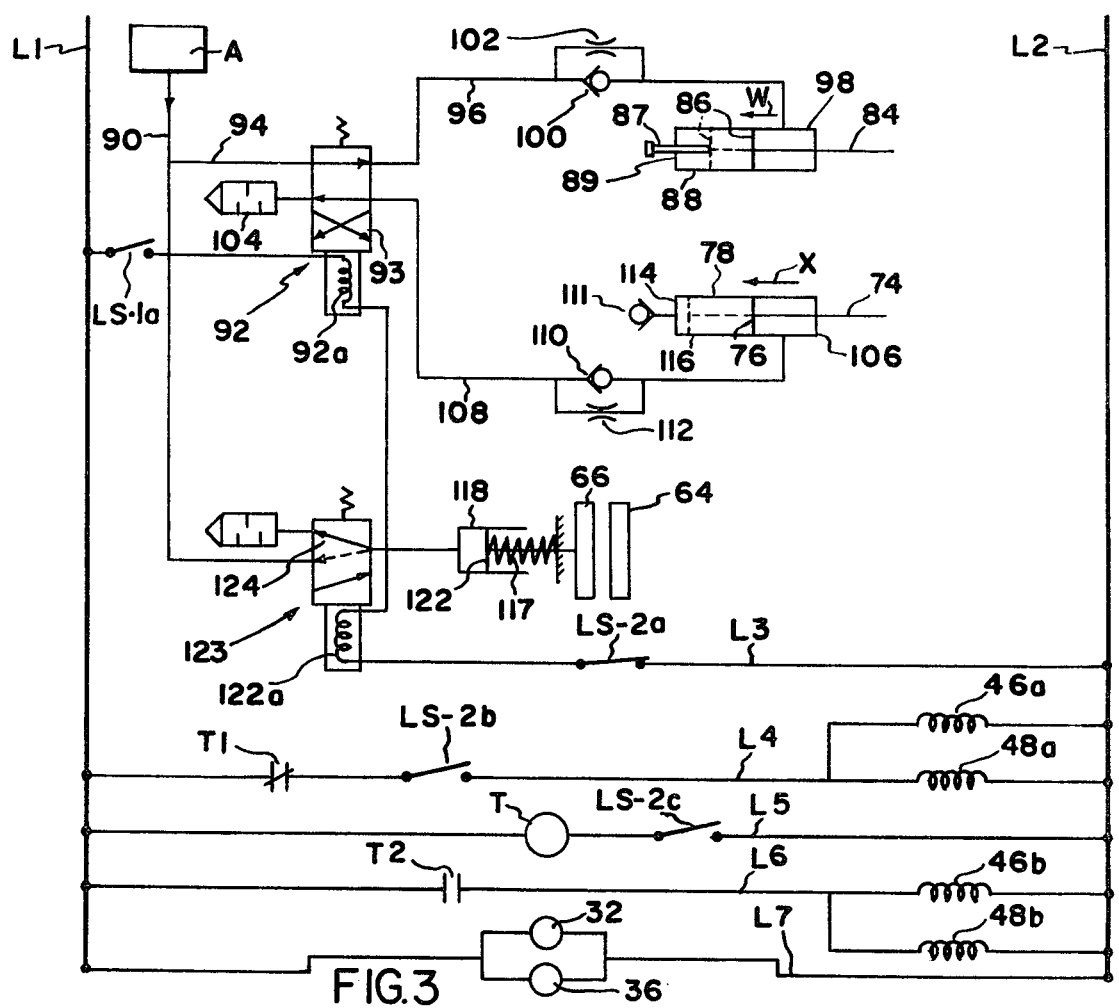
FIG. 3 is a schematic diagram illustrating pneumatic and electrical control circuit for controlling the apparatus illustrated in FIGS. 1 and 2.

The fluid and electrical control circuit, for controlling the operation of the thermoforming apparatus illustrated in FIGS. 1 and 2, is illustrated in FIG. 3. Firstly, the fluid control circuit includes an air supply line 90 for supplying pressurized air from a source A to a two position, solenoid actuated, fluid control valve, generally designated 92, via a conduit 94. When the spool 93 of valve 92 is in the position illustrated in FIG. 3, pressurized air will be delivered to a conduit 96 which supplies pressurized air to one end 98 of the return cylinder 88 for driving the return piston 86 from a start position illustrated in FIG. 3 to an end position illustrated in chain lines in FIG. 3. Connected in fluid line 96 is a check valve 100 which permits the free flow of air to the end 98 of return cylinder 88 when the valve 92 is in the position illustrated in FIG. 3. Valve 100 precludes the reverse flow of air therethrough when flow control valve 92 is in the "cross-over" position. Also, connected in parallel with the check valve 100 is an adjustable, flow control valve 102 for cushioning the flow of air out of the return cylinder end 98 when air is supplied to the advance cylinder 78 as will immediately become apparent.

The valve 92 includes a solenoid 92a for shifting the spool 93 of the valve 92 to the "crossover" position in which line 96 is coupled to an exhaust 104 for permitting air in the return cylinder end 98 to be exhausted via line 96 and the control valve 102.

When the valve 92 is in the position illustrated in FIG. 3, the exhaust 104 is coupled to the end 106 of advance cylinder 78 via a line 108. Coupled in line 108 is a check valve 110, which permits the free flow of pressurized air from line 94 to the advance cylinder end 106 when the control valve 92 is in the cross-over position. Connected in parallel with the check valve 110 is an adjustable, flow control valve 112 which restricts and controls the flow of air from the advance cylinder end 106 to the exhaust 104 when the valve 92 is in the position illustrated in FIG. 3. The check valves 110 and 100 are so constructed as to not permit the reverse flow of air therethrough. A check valve 111 is provided in the opposite end wall 114 of advance cylinder 78 and permits the free flow of air, encased in the opposite end 116 of advance cylinder 78, when the piston 76 is moved from a start position illustrated in FIG. 3 to a finish position illustrated in chain lines in FIG. 3. The check valve 111 precludes the reverse flow of air therethrough so that a vacuum will build in the advance cylinder end as the advance piston 76 returns from the finish position to the start position.

As is illustrated in FIG. 3, the clutch 62 includes a pneumatically operated cylinder 118 mounting a piston 122 which is coupled to the clutch plate 66 for selectively moving the clutch plate 66 into driving engagement with the opposite clutch plate 64. A spring, schematically designated 117, normally maintains the clutch plates in spaced relation. Air is supplied from line 90 to the cylinder 118 via the control valve 123 including a valve spool 124 and a solenoid 122a which will move the valve spool 124 against the biasing force of spring 117 from the position illustrated in FIG. 3 to the chain line position illustrated in FIG. 3. When the valve spool 124 is in the position illustrated in FIG. 3, the clutch plate 66 is spring biased away from the clutch plate 64 and power transmitted to the sprocket wheel 68 is not transmitted to the shaft 20 or sheet carrying chains 24. When the valve spool 124 is moved to the position illustrated in chain lines, pressurized air is supplied from line 90 to the cylinder 118 to force the plates 66 and 64 into driving engagement and the power transmitted to the sprocket wheel 68 will be coupled to the drive chains 24 to forwardly index the chains 24 and the sheet S carried thereby.

The electrically control circuit for operating the apparatus illustrated in FIGS. 1 and 2 is also illustrated in FIG. 3, and includes a pair of input circuit lines L1 and L2 connected to a suitable source of power such as 110 volt alternating current. A plurality of circuit lines L3 through L7 are connected across the lines L1 and L2. The circuit line L3 is connected across lines L1 and L2 and includes a set of limit switch contacts LS-1a of a limit switch LS-1 which is actuated when the upper mold 42 is fully retracted to the raised position illustrated in FIG. 1.

The normally open contacts LS-1a are connected in series with the valve actuating solenoid 92a, the clutch actuating solenoid 122a and a pair of normally closed limit switch contacts LS-2a included with the limit switch LS-2 mounted on the side frame member 10. The normally closed limit switch LS-2a are opened when the piston 86 of return cylinder 88 is fully extended.

When the limit switch contacts LS-2a are opened, current flow to the solenoids 92a and 122a is interrupted.

Connecting across lines L1 and L2 is a circuit line L4 including a set of normally open limit switch contacts LS-2b and parallelly connected solenoids 46a and 48a for controlling valves (not shown) which deliver pressurized air to the upper and lower sides of the upper and lower cylinders 46 and 48 respectively to move the molds 42 and 44 to closed positions, clamped to opposite sides of the plastic sheet S. A set of normally closed timer contacts T1 is also connected in circuit line L4. Connected in line L5 across the lines L1 and L2 is a timer T and a set of normally open contacts LS-2c which close when the limit switch LS-2 is tripped.

Connected in lines L6, across the lines L1 and L2 are a set of normally open timer contacts T2, which close a predetermined time after the timer T is energized, and parallelly connected solenoids 46b and 48b which operate valves to retract the mold driving pistons 50 and 52 of cylinders 46 and 48 respectively to withdraw the molds 42 and 44 to the remote positions. The timer also includes the set of timer contacts T2 connected in line L4.

THE OPERATION

Assuming that a forming cycle has just been completed and the molds 42 and 44 retract to the positions illustrated in FIG. 1, the limit switch LS-1 will be actuated to close the contacts LS-1A (Line L3) to energize the valve control solenoids 92a and 122a. A continuous sheet S of plastic is carried by the sheet support chains 24. When the solenoid 92a is energized, the valve spool 93 of valve 92 will move to the "crossover" position and pressurized air will be supplied from air supply line 90 to line 108 via the check valve 110 to drive the advance cylinder 76 from the start position, illustrated in FIG. 3, to the left in a direction represented by the arrow X (FIG. 3). When the solenoid 122a is energized, the spool 124 of valve 123 is moved to the position illustrated in chain lines in FIG. 3 and pressurized air will be supplied to the clutch control cylinder 118 so that the clutch plate 66 will be drivingly coupled to the clutch plate 64. As the advance piston 76 is moved in a direction of the arrow X, the drive chain 70 will move therewith in the direction of the arrow X to rotate the sprocket wheel 68 and clutch plate 66 clockwisely as viewed in FIG. 1. As the chain 70 negotiates the sprocket wheel 68, it will draw the piston rod 84 and piston 86 of the return cylinder in the direction of the arrow Y. This will force fluid from the return cylinder end 98 through flow control valve 102 to exhaust port 104.

As the advance cylinder piston 76 is moved to the left in the direction of the arrow X, the air in the return cylinder end 98 will automatically operate as a dampener to dampen movement of the advance piston 76 because the passage of air from return cylinder end 98 will be restricted by the flow control valve 102. The dampening of return piston 86 precludes the bottoming out of advance piston 76 against the cylinder end wall 114. This circuit arrangement eliminates necessity for additional hydraulic dampeners and deceleration valves.

When the return piston rod 84 is fully extended, it will trip the limit switch LS-2 to close the normally open limit switch contacts LS-2b (line L4) and LS-2c (line L5) and open the normally closed contacts LS-2a (line L3). When the limit switch contacts LS-2a are opened, the air control valve 92 is spring returned to the position illustrated in FIG. 3 and pressurized air is coupled from line 90 to the retract cylinder end 98 of return cylinder 88 via the check valve 100. This will force the retact piston 86 in an opposite direction represented by the arrow W and pull the drive chain 70 therewith in a direction so as to rotate the sprocket wheel 68 counterclockwisely as illustrated in FIG. 1. The return piston 86 can be returned to a much slower rate than the rate of advance of the piston 76 because there is substantially more time available for return during the forming cycle.

At the same time, the piston rod 74 and advance piston 76 are moved in the opposite direction Z to force air remaining in the advance cylinder end 106 through the flow control valve 112 to the discharge exhaust port 104. At this same time, the valve control solenoid 122a is de-energized and the spool 124 of valve 122 will return to the position illustrated in FIG. 3 and the coil spring, schematically designated 117, will force the clutch control piston 120 to the left, as illustrated in FIG. 3, to separate the clutch plates 66 and 64 and decouple the drive chain 70 from the sheet support chains 24. Accordingly, although the chain 70 is driven in a reverse path of travel, the sheet support chains 24 are not reversely driven. Since the clutch is now de-energized, the inertia of the system during the return (arrows W and Z) is substantially less because the sheet and sheet support chains are not being moved. Only the inertia of the chain and cylinders is involved and thus the dampening is not as critical, but the passaged air from advance cylinder end 106 through flow control valve 112 will dampen the return movement of retract piston 86. At the end of its return travel, the retract piston 86 merely abuts the stop 87. The length of the following indexing stroke can be adjusted if desired by rotating the screw of stop 87.

The molds 42 and 44 are moved to a closed position when the normally open contacts LS-2b (line L4) are closed to energize the mold advance solenoids 46a and 48a. When the limit switch contacts LS-2c (line L5) close, the timer T (line L5) is energized. After a predetermined forming cycle is completed, the contacts T1 (line L6) close to energize the retract solenoids 46b and 48b so that the molds 42 and 44 are retracted to the removed positions illustrated in FIG. 1. At the same time, the normally closed timer contacts T2 (line L6), are opened to interrupt circuit line L4. When the solenoids 46b and 48b are energized, the molds 42 and 44 are returned to their raised positions to again close the limit switch LS-1 and the cycle is again repeated. The flow control valves 102 and 112 can be adjusted to control the speed of the advance and the speed of return.

When the advance cylinder 76 moves to the left in the direction of the arrow X, air entrapped therein can move outwardly through the check valve 111. When the advance piston 76 is drawn to the right, in the direction of the arrow Z, the check valve 111 precludes the reverse flow of air to the advance cylinder end 116 and maintains a vacuum in the cylinder end 116. The vacuum will tend to build as the chamber 116 expands. This will tend to maintain tension on the chain 70 and keep the chain tight and prevent slack from developing in the chain.

The operator can adjust the stroke by merely rotating the screw thread stop 87 inwardly or outwardly in the return cylinder 88.

It is to be understood that the drawings and descriptive matter are in all cases to be interpreted as merely illustrative of the principles of the invention, rather than as limiting the same in any way, since it is contemplated that various changes may be made in various elements to achieve like results without departing from the spirit of the invention or the scope of the appended claims.

I claim:

1. A differential pressure forming machine comprising:
   endless sheet support means comprising a pair of laterally spaced, longitudinally extending, endless sheet support members movable in endless paths of travel for supporting a thermoplastic sheet;
   means for heating said moldable, thermoplastic sheet to a forming temperature;
   mold means for applying differential pressure to said heated sheet to form a shape therein;
   means for intermittently incrementally indexing said endless support means to incrementally advance said sheet to said mold means and remove said sheet from said mold means after a shape is formed therein, including:
   drive train means including power transmitting means movable in forward and reverse paths for driving said endless support members and
   clutch means for selectively coupling said power transmitting means and said endless support members to drive said endless support members only when said drive train means moves in one of said forward and reverse paths;
   fluid driven advance drive means comprising a fluid receiving advance cylinder; an advance piston mounted in said cylinder; means mounting said advance cylinder and said advance piston for relative, reciprocal movement; means coupling one of said piston and cylinder to one end of said power transmitting means; and
   fluid driven return drive means comprising a fluid receiving return cylinder; a return piston received by said return cylinder; means mounting said return cylinder and said return piston for relative reciprocal movement; and means coupling one of said return cylinder and said return piston to the other end of said power transmitting means.

2. The machine set forth in claim 1 including stop means within one of said cylinders for adjustably controlling the length of the stroke of one of said pistons in one of said forward and reverse paths.

3. The machine as set forth in claim 1 wherein including fluid communicating line means at one end of said advance cylinder for permitting the passage of fluid to said advance cylinder on one side of said advance piston to move said advance piston in one direction and advance said power transmitting means; and check valve means at the other end of said advance cylinder and on the opposite side of said advance piston for permitting the escape of air from said other end of said advance cylinder when fluid is admitted to said one end and said piston moves in said one direction; said check valve means preventing the reverse flow of ambient air to said other end of said advance cylinder when said advance piston moves in an opposite direction to permit a vacuum to build in said cylinder on said opposite side of said piston and inhibit the release of tension on said power transmitting means.

4. The machine as set forth in claim 3 including means for selectively operating said clutch means to couple said power transmitting means to said endless support members when said fluid is delivered to said advance cylinder means; means is provided for delivering fluid to said retract cylinder on one side of said retract piston, means is provided for operating said clutch means to decouple said transmission means and said support members when said fluid is delivered to said retract cylinder.

5. The machine as set forth in claim 4 including means for interrupting the flow of fluid to said advance and retract cylinders when fluid is delivered to said retract and advance cylinders respectively.

6. The machine as set forth in claim 5 including stop means within said retract cylinder on the opposite side of said retract piston.

7. The machine as set forth in claim 5 including a flow valve restricter means for restricting the flow of fluid from said advance and retract cylinders when fluid is delivered to said retract and advance cylinders respectively.

8. A differential pressure thermoforming machine comprising:
   a pair of endless laterally spaced, longitudinally extending sheet support members, movable in endless paths of travel, for supporting said sheet and incrementally moving said sheet in a forward path of travel;
   means for heating said moldable, thermoplastic sheet to a forming temperature;
   mold means for applying differential pressure to said heated sheet to form a shape therein;
   a rotary drive sprocket wheel;
   clutch means for selectively drivingly coupling and decoupling said sprocket wheel and said endless support members;
   a drive chain, having opposed ends, trained around said sprocket wheel and movable in a forward and reverse path of travel to drive said sprocket wheel in forward and reverse paths of travel;
   means for operating said clutch means in timed relation with movement of said drive chain to couple said sprocket wheel to said endless members only when said drive chain and sprocket wheel move in one of said forward and reverse paths of travel;
   fluid driven, advance drive means comprising a fluid receiving advance cylinder, a fluid drive advance piston reciprocally mounted in said advance cylinder, and means coupling said advance piston to one end of said drive chain to move said drive chain in said forward path; and
   fluid driven, return drive means comprising a fluid receiving return cylinder, a fluid driven return piston reciprocally movable in said return cylinder, and means coupling said return piston to the other end of said drive chain to move said drive chain in said reverse path.

9. The differential pressure thermoforming machine set forth in claim 8 wherein stop means is threadedly mounted in one end of one of said cylinders to adjustably limit the stroke of one of said pistons.

10. The differential pressure thermoforming machine set forth in claim 8 wherein said cylinders comprise enclosed pneumatic cylinders each having an air supply conduit at one end and an exhaust port at the opposite end;
    check valve means connected to said exhaust port of said advance cylinder permitting air to be exhausted when air is supplied to said one end of said advance piston as said advance piston moves in a first direction, said check valve means prohibiting the reverse flow of air to said opposite end of said advance cylinder when said advance piston moves in an opposite direction so that a vacuum builds in said opposite end of said advance cylinder and maintains tension force on said drive chain.

11. In a differential pressure forming machine including endless, laterally spaced sheet support chains, for supporting and forwardly advancing a deformable thermoplastic sheet, the improvement comprising:
   a heater for heating said sheet of deformable, thermoplastic material to a forming temperature;
   mold means for applying differential pressure to said heated sheet to form a shape therein;
   a drive chain, having opposite ends;
   clutch means for selectively, drivingly coupling and decoupling said drive chain and said support chains;
   advance drive means and retract drive means coupled to said opposite ends of said drive chain for moving said drive chain in forward and reverse paths; and
   means for operating said clutch means in timed relation with said advance drive means and said retract drive means to couple said drive chain to said sheet support chains only when said advance drive means moves said drive chain in said forward path of travel to incrementally forwardly index said support chains and said sheet.

12. The machine set forth in claim 11 wherein said advance drive means and said retract drive means are alternately and oppositely movable between start and finish positions; fluid circuit means for alternately supplying fluid to said advance drive means and said retract drive means to alternately move said advance drive means and said retract drive means from said start positions to said finish positions and concurrently draw, via said drive chain, said retract drive means and said advance drive means between said finish positions and said start positions.

13. The machine as set forth in claim 12 wherein said fluid circuit means includes means for permitting the flow of fluid from said retract drive means and said supply drive means as said fluid circuit means supplies fluid to said advance drive means and said retract drive means respectively.

14. The machine as set forth in claim 13 wherein said fluid circuit means includes adjustable flow control means for selectively controlling the flow of fluid from said advance drive means and said retract drive means as fluid is supplied to said retract drive means and said advance drive means respectively to cushion the travel of said retract drive means and said advance drive means respectively.

15. The machine as set forth in claim 14 including adjustable stop means in the path of one of said advance drive means and said retract drive means to adjust the distance said support chains are indexed.

16. The machine as set forth in claim 12 wherein said advance drive means comprises an advance fluid receiving cylinder, an advance piston received by said cylinder reciprocally movable in a to-and-fro path, and means coupling said piston to one end of said drive chain; and
   means coupling said fluid circuit means to one end of said cylinder to supply fluid to one side of said piston; and check valve means coupled to the opposite end of said cylinder for permitting any air in the opposite end of said cylinder to be driven out of said cylinder by the opposite side of said piston as fluid is supplied to one side of said piston to move said piston in one direction but prohibiting the reverse flow of air as said piston moves in the opposite direction to build a vacuum and retard movement of said piston in said opposite direction.

* * * * *